Jan. 20, 1959  J. W. HOOD  2,870,078
CELLS FOR ELECTRO-CHEMICAL MEASUREMENTS
Filed Aug. 14, 1953
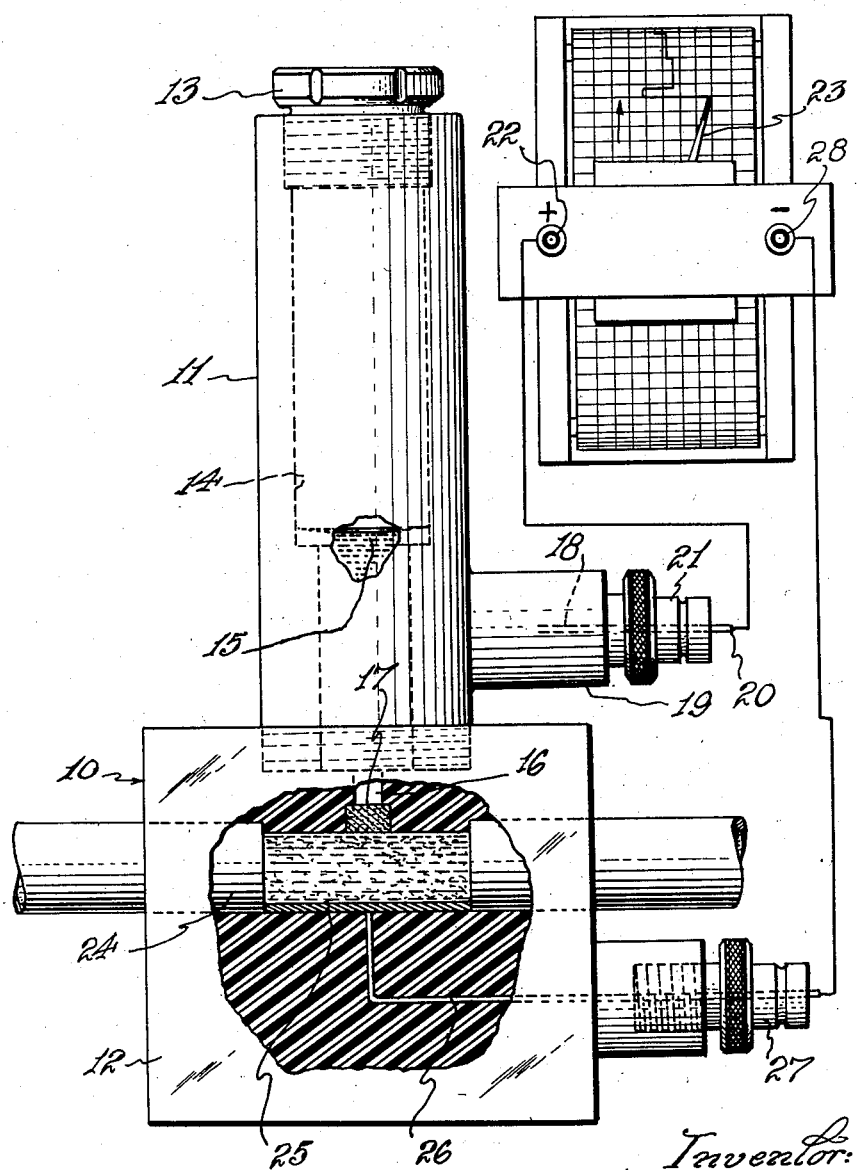
Inventor:
John W. Hood
By Taylor, Cifelli & Junck
Attorneys United States Patent Office 2,870,078
Patented Jan. 20, 1959

2,870,078

CELLS FOR ELECTRO-CHEMICAL MEASUREMENTS

John W. Hood, Ridgewood, N. J., assignor to H. Z. Corporation, Ridgewood, N. J., a corporation of New Jersey Application August 14, 1953, Serial No. 374,410

3 Claims. (Cl. 204—195)

This invention relates to novel cells for use in making electro-chemical measurements.

An object of this invention is to provide a compact cell suitable for taking electro-chemical measurements in a continuous and substantially instantaneous manner on liquids flowing there-through.

Other objects of my invention will become apparent from the following description.

A specific example of my novel cell is described herein by way of example only and in accordance with the manner in which I now prefer to practice the invention, the following detailed description, taken in connection with the accompanying drawing, being intended for the purpose of illustration.

Referring to the drawing which is a side elevation, in part section, in part schematic, and in part broken away, the cell comprises a plastic body 10 made from electrically-insulating material, such as polystyrene, having an upper portion 11 and a lower portion 12. The upper portion 11 has a screw cap 13 on a reservoir 14 for an electrolyte 15, such as aqueous potassium chloride and a constricted lower channel 16 into which a porous plug 17 of inert material such as porcelain is securely fitted. The balance of a calomel half cell 18 (mercurous chloride and mercury) is contained in the side-arm 19 and is merely shown schematically. The KCl and the mercurous chloride-mercury are in actual contact. A wire 20 extends from this half-cell to the terminal 21, which may in turn be electrically united in known manner to one terminal 22 of a potential-recording instrument or recorder 23.

Located immediately under the porous plug 17 is a horizontal bore or conduit 24, the location being such that any fluid flowing through the conduit is necessarily in contact with the plug 17 as it passes there-below.

Inserted in the lower part of the bore-conduit 24 so as to be flush with the inner surface thereof is a curved piece of platinum 25 or other noble metal. As in the case of the plug 17, so also with the platinum curved insert 25, any liquid which flows through the conduit 24 necessarily is in contact with the insert 25 as it passes, in this case thereover. A wire 26 joins the insert to the terminal 27, which may be electrically joined in known manner to the other terminal 28 of a recorder.

In operation, liquid which is to be subjected to an electro-chemical measurement is fed through the conduit 24. As it passes the plug 17 any variations in the nature of the liquid will be substantially instantaneously apparent by the differences in the resulting potential as shown by a suitable measuring device, e. g., the recorder 23. A permanent record of these potentials can be obtained by the use of suitable recording charts and instruments in the recorder. Any indicated corrective action can be taken quickly and accurately in order to make the liquid conform to a pre-determined standard, if desired.

My novel cells may be employed to yield excellent results on a variety of flowing liquids whose electro-chemical characteristics are being determined. Thus, in the case of boiler feed water, it is important to know the concentration of dissolved oxygen therein at all times. By simply placing my novel cell in series with the boiler feed water, and substituting a polarograph for recorder 23, electrical readings are quickly and accurately obtained, and from these readings, by suitable calculations well understood in the art, the desired data on dissolved oxygen concentration can be obtained. Any necessary corrective action can then be taken as indicated by the readings and/or calculations.

In similar manner, my novel cell lends itself to the determination of the concentration of chlorine, chromates, organic matter, sulfites, oxidation-reduction potential (in sewage), and the obtaining of measurements on any material that gives a stable potential.

It will now be apparent to those skilled in the art that my novel cells have certain unique advantages. They lend themselves in a technically-simple manner to utilization in connection with liquids which can be passed there-through without causing any adverse effects on the apparatus and hence on the data obtained. This is a special consideration in the treatment of liquids such as slurries, raw sewage and semi-liquids which normally may contain fibrous inclusions and abrasive particles.

This application is a continuation in part of my co-pending applications, Serial No. 171,641, filed July 1, 1950 and Serial No. 270,428, filed February 7, 1952, both now abandoned.

While I have described my invention in detail in its preferred embodiment, it will be obvious to those skilled in the art, after understanding my invention, that various changes and modifications may be made therein without departing from the spirit or scope thereof. I aim in the appended claims to cover all such modifications and changes.

I claim:

1. A cell for use in making electro-chemical measurements of liquids such as raw sewage and slurries continuously flowing therethrough, comprising an electrically non-conductive body having a continuous straight-through bore, straight tubular means for providing continuously substantially unobstructed flow for said liquids through said bore, means at the end of said means providing for the introduction and discharge of said liquids, a noble metal electrode flushly recessed in a portion of said bore, an aperture perpendicular to said bore containing a porous plug, the surface of the plug being flush with the surface of said bore, half-cell means providing a half-cell and salt bridge providing electrical communication between said half-cell and said porous plug, said salt bridge having an elongated reservoir for an electrolyte in axial alinement with said aperture; and electrical measuring means connected to said metal electrode and said half-cell.

2. A cell in accordance with claim 1, wherein said non-conductive body is a plastic material.

3. A cell in accordance with claim 2, wherein said plastic is polystyrene.

References Cited in the file of this patent

UNITED STATES PATENTS

| 1,668,434 | Todd | May 1, 1928 |
| 2,289,687 | Stuart | July 14, 1942 |
| 2,383,450 | Coleman | Aug. 28, 1945 |